United States Patent
Woo et al.

(10) Patent No.: US 10,622,641 B2
(45) Date of Patent: Apr. 14, 2020

(54) SECONDARY BATTERY ANODE COMPRISING LITHIUM METAL LAYER HAVING MICROPATTERN AND PROTECTIVE LAYER THEREOF, AND METHOD FOR PRODUCING SAME

(71) Applicant: LG CHEM, LTD., Seoul (KR)

(72) Inventors: Sang Wook Woo, Daejeon (KR); Jeong Woo Shon, Daejeon (KR); Oh Byong Chae, Daejeon (KR); Hee Won Choi, Daejeon (KR); Eun Kyung Kim, Daejeon (KR); Ki Hwan Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/083,676

(22) PCT Filed: Jan. 11, 2018

(86) PCT No.: PCT/KR2018/000504
§ 371 (c)(1),
(2) Date: Sep. 10, 2018

(87) PCT Pub. No.: WO2018/131899
PCT Pub. Date: Jul. 19, 2018

(65) Prior Publication Data
US 2019/0074520 A1    Mar. 7, 2019

(30) Foreign Application Priority Data
Jan. 16, 2017 (KR) .................. 10-2017-0006944

(51) Int. Cl.
*H01M 4/74* (2006.01)
*H01M 4/04* (2006.01)
(Continued)

(52) U.S. Cl.
CPC ............... *H01M 4/74* (2013.01); *H01M 4/02* (2013.01); *H01M 4/04* (2013.01); *H01M 4/0421* (2013.01);
(Continued)

(58) Field of Classification Search
None
See application file for complete search history.

(56) References Cited

U.S. PATENT DOCUMENTS 6,063,142 A    5/2000   Kawakami et al.

FOREIGN PATENT DOCUMENTS

| EP | 3 255 708 A1 | 6/2013 |
|---|---|---|
| EP | 3486976 A1 | 5/2019 |

(Continued)

OTHER PUBLICATIONS

Park et al., "Micro-patterned lithium metal anodes with suppressed dendrite formation for post lithium-ion batteries," Advanced Materials Interfaces, vol. 3, No. 11, 2016, 9 pages, XP055580573.

(Continued)

*Primary Examiner* — Wyatt P McConnell
(74) *Attorney, Agent, or Firm* — Birch, Stewart, Kolasch & Birch, LLP (57) ABSTRACT

The present disclosure relates to a negative electrode for a secondary battery and a manufacturing method thereof, the negative electrode including a negative electrode current collector and a lithium metal. The present disclosure provides a negative electrode for a secondary battery including a negative electrode current collector; a lithium metal layer having a fine pattern formed on the negative electrode collector; and a protective layer formed along the surface of the lithium metal layer having the fine pattern, and a method for forming a lithium metal layer having a fine pattern formed thereon and the protective layer.

(Continued)

In the negative electrode for a secondary battery according to the present disclosure, effective current density may be reduced and battery capacity may be maximized by forming a fine pattern on a surface of a lithium metal included in a negative electrode to increase an electrode specific surface area. Also, an increase in battery resistance may be prevented and charge and discharge cycle efficiency may be improved by forming a pattern on a surface of a lithium metal to improve an interfacial adhesion between a lithium metal and a protective layer thereof.

10 Claims, 8 Drawing Sheets

(51) Int. Cl.
    *H01M 4/02* (2006.01)
    *H01M 4/70* (2006.01)
    *H01M 4/1393* (2010.01)
    *H01M 4/75* (2006.01)
    *H01M 4/66* (2006.01)
    *H01M 10/052* (2010.01)

(52) U.S. Cl.
    CPC ......... *H01M 4/1393* (2013.01); *H01M 4/663* (2013.01); *H01M 4/70* (2013.01); *H01M 4/75* (2013.01); *H01M 10/052* (2013.01); *H01M 2004/027* (2013.01)

(56) References Cited

FOREIGN PATENT DOCUMENTS

| | | | |
|---|---|---|---|
| JP | 6-223820 | A | 8/1994 |
| JP | 7-201357 | A | 8/1995 |
| JP | 3347555 | B2 | 11/2002 |
| JP | 3570128 | B2 | 9/2004 |
| JP | 2009-266464 | A | 11/2009 |
| JP | 2016-154112 | A | 8/2016 |
| KR | 10-2013-0067920 | A | 6/2013 |
| KR | 10-2013-0122578 | A | 11/2013 |
| KR | 10-2014-0142576 | A | 12/2014 |

OTHER PUBLICATIONS

Ryou et al., "Mechanical surface modification of lithium metal: towards improved Li metal anode performance by directed Li plating," Advanced Functional Materials, vol. 25, No. 6, 2015, pp. 834-841, XP001595266.

International Search Report for PCT/KR2018/00504 dated May 8, 2018.

```
┌─────────────────────────────────────────────────────────┐
│ PREPARING STACK IN WHICH LITHIUM METAL IS LAMINATED     │
│ ON NEGATIVE ELECTRODE CURRENT COLLECTOR                 │
└─────────────────────────────────────────────────────────┘
                            ↓
┌─────────────────────────────────────────────────────────┐
│ ETCHING SURFACE OF LITHIUM METAL LAYER (OPTIONAL)       │
└─────────────────────────────────────────────────────────┘
                            ↓
┌─────────────────────────────────────────────────────────┐
│ PRINTING PATTERN ON SURFACE OF LITHIUM METAL LAYER      │
│ USING SLICON MASTER MORD TO FORM PATTERNED              │
│ LITHIUM METAL LAYER                                     │
└─────────────────────────────────────────────────────────┘
                            ↓
┌─────────────────────────────────────────────────────────┐
│ ETCHING SURFACE OF LITHIUM METAL LAYER (OPTIONAL)       │
└─────────────────────────────────────────────────────────┘
                            ↓
┌─────────────────────────────────────────────────────────┐
│ DEPOSITING CARBON OR LITHIUM FLUORIDE ON SURFACE        │
│ OF LITHIUM METAL LAYER TO FORM PROTECTIVE LAYER         │
└─────────────────────────────────────────────────────────┘
```

Fig. 8

SECONDARY BATTERY ANODE COMPRISING LITHIUM METAL LAYER HAVING MICROPATTERN AND PROTECTIVE LAYER THEREOF, AND METHOD FOR PRODUCING SAME

TECHNICAL FIELD

The present disclosure relates to a negative electrode for a secondary battery and a method of manufacturing the same, and more particularly to a negative electrode including a lithium metal having a fine pattern shape and a protective layer thereof and a method of manufacturing the same, and a secondary battery including the same.

Background Art

Recently, interest in energy storage technology is increasing. Due to the expanded application of cell phones, camcorders, notebook computers, and electric automobiles, research and development efforts for electrochemical devices are becoming more specified.

The electrochemical devices are the most remarkable field in such an aspect, and among them, development of secondary batteries capable of charging and discharging has been the focus of attention. In recent years, research and development to design new electrodes and batteries capable of improving capacity density and specific energy have been progressed in developing such a secondary battery.

Among secondary batteries that have been currently applied, lithium secondary batteries developed in the early 1990s have been in the spotlight due to advantages such as higher operating voltage and much greater energy density than conventional batteries such as Ni-MH batteries, Ni—Cd batteries, sulfuric acid-lead batteries, or the like using an aqueous electrolyte.

A general method of manufacturing a lithium secondary battery includes applying a slurry including a positive electrode active material and a negative electrode active material to each current collector and then winding or laminating together with a separator as an insulator to manufacture and prepare an electrode assembly, inserting the electrode assembly into a battery case, injecting an electrolyte into the battery case and sealing the battery case, and degassing to remove gas generated during the initial formation.

Although a lithium metal negative electrode has been examined as a negative electrode capable of achieving energy density 10 times higher than that of a conventional graphite negative electrode (theoretical capacity: 372 mAh/g) with a low standard hydrogen potential (−3.04 V vs. SHE) and a high theoretical capacity (3,860 mAh/g), in order to use a lithium metal as a negative electrode of a lithium ion secondary battery, there are problems such as a poor electrode life cycle and safety of the lithium metal, which is related to strong reactivity of the lithium metal. When the lithium metal is exposed to an air atmosphere, $Li_2CO_3$, $Li_2O$, LiOH, etc. are formed on a surface of the lithium metal according to the type of gas present in the atmosphere. Since a native film is porous, when the lithium metal is immersed in an electrolyte, a type of passivation film is formed on the surface of the lithium metal by reaction with a solute or solvent of the electrolyte, and such a film is referred to as a solid electrolyte interface (SEI) layer, When the lithium metal is used as a negative electrode, a new passivation film is continuously formed by the reaction with an electrolyte when charging and discharging are performed, accordingly the lithium metal is consumed and an amount thereof is gradually reduced.

Also, the native film or the passivation film makes current density nonuniform on a surface of the lithium metal and reduces a surface area required for dissolution and deposition of lithium. The form of deposited lithium is related to the charge and discharge current density, the type of an electrolyte, and the growth of lithium in the form of dendrites, moss, and sphere. A part of the lithium that grows in the form of dendrite is broken during discharge to form dead lithium. Although it is impossible to electrochemically charge and discharge the dead lithium, it has chemically strong reactivity. Accordingly, due to the formation of the dead lithium and the passivation film, it is difficult to reversibly charge and discharge lithium when the lithium metal is used as a negative electrode of a lithium ion secondary battery, and electrode lifespan characteristics of the lithium metal are poor and the thermal stability is also decreased in a non-aqueous electrolyte.

Accordingly, there is an urgent need to develop technique that maximizes battery capacity by preventing lithium consumption (i.e., irreversible capacity loss) in a battery, which is caused by the formation of SEI layer on the surface of a negative electrode during the initial formation.

DISCLOSURE

Technical Problem

The present disclosure is provided to solve the above-described problems of the related art and technical problems which are identified in the past. Specifically, the present disclosure is directed to maximize capacity of a battery by preventing lithium consumption in a battery, which is caused by formation of a native film or a passivation film of lithium metal.

Technical Solution

According to one aspect of the present disclosure, there is provided a negative electrode for a secondary battery, which is a negative electrode having a negative electrode current collector and a lithium metal, the negative electrode including: a negative electrode current collector; a lithium metal layer having a fine pattern formed on the negative electrode current collector; and a protective layer formed along a surface of the lithium metal layer having the fine pattern.

According to one exemplary embodiment of the present disclosure, a shape of the pattern may have any one of a mesh shape, a lamellar shape, an embo shape, a linear shape, a circular shape, an elliptical shape, a polygonal shape, and a waveform shape.

According to another exemplary embodiment of the present disclosure, the protective layer may be formed by depositing carbon or lithium fluoride (LiF) on a surface of the lithium metal.

According to another aspect of the present disclosure, there is provided a method for preparing a negative electrode for a secondary battery, which has a lithium metal having a pattern and a protective layer, the method including: disposing a pattern mask on a negative electrode current collector; forming a lithium metal layer having the pattern by depositing the lithium metal on the negative electrode current collector on which the pattern mask is disposed; and depositing carbon or lithium fluoride (LiF) on a surface of the lithium metal layer having the fine pattern to form the protective layer. According to one exemplary embodiment of the present disclosure, a process of etching the surface of the lithium metal may be further included after forming the lithium metal layer having the pattern. In the process of forming the lithium metal layer having the pattern, the lithium metal may be deposited on the negative electrode current collector using any one method of thermal vapor deposition (TVD), physical vapor deposition (PVD), sputtering deposition, and spin coating deposition.

According to still another aspect of the present disclosure, there is provided a method for preparing a negative electrode for a secondary battery, which has a lithium metal having a pattern and a protective layer, the method including: laminating the lithium metal on a negative electrode current collector to manufacture a stack; forming a lithium metal layer having a pattern by printing the pattern on the lithium metal using a silicon master mold; and depositing carbon or lithium fluoride (LiF) on a surface of the lithium metal layer having the fine pattern to form the protective layer.

A process of etching the surface of the lithium metal may be further included at any stage before or after the process of forming the lithium metal layer having the pattern.

In the present disclosure, a method of forming the protective layer along the surface of the lithium metal having the fine pattern may use any one method of thermal vapor deposition (TVD), physical vapor deposition (PVD), or sputtering deposition.

In a preparation of the negative electrode of the present disclosure, a method of etching the surface of the lithium metal may be either inert gas plasma sputtering or plasma etching.

According to still yet another aspect of the present disclosure, there is provided a lithium secondary battery including a positive electrode, a negative electrode, a separator interposed between the positive electrode and the negative electrode, and an electrolyte in which a lithium salt is dissolved, and the negative electrode is the negative electrode of claim 1.

Effects of the Invention

In the present disclosure, effective current density can be reduced and battery capacity can be maximized by forming a fine pattern on a surface of a lithium metal included in a negative electrode to increase an electrode specific surface area.

Also, an increase in battery resistance can be prevented and charge and discharge cycle efficiency can be improved by forming pattern on a surface of a lithium metal to improve an interfacial adhesion between the lithium metal and a protective layer thereof.

DETAILED DESCRIPTION OF THE PREFERRED EMBODIMENTS

Hereinafter, exemplary embodiments of the present disclosure will be described in detail with reference to the drawings, which are for easing understanding of the present disclosure, and the scope of the present disclosure is not limited thereto.

A Negative Electrode

The present disclosure relates to a negative electrode including a negative electrode current collector and a lithium metal, the negative electrode including: a negative electrode current collector; a lithium metal layer having a fine pattern formed on the negative electrode current collector; and a protective layer formed along the surface of the lithium metal layer having a fine pattern.

In the present disclosure, effective current density may be reduced and battery capacity may be maximized by forming a fine pattern on a surface of a lithium metal included in a negative electrode to increase an electrode specific surface area, and an increase in battery resistance may be prevented and charge and discharge cycle efficiency may be improved by forming a pattern on a surface of a lithium metal to improve an interfacial adhesion between a lithium metal and a protective layer thereof.

Figure 4:
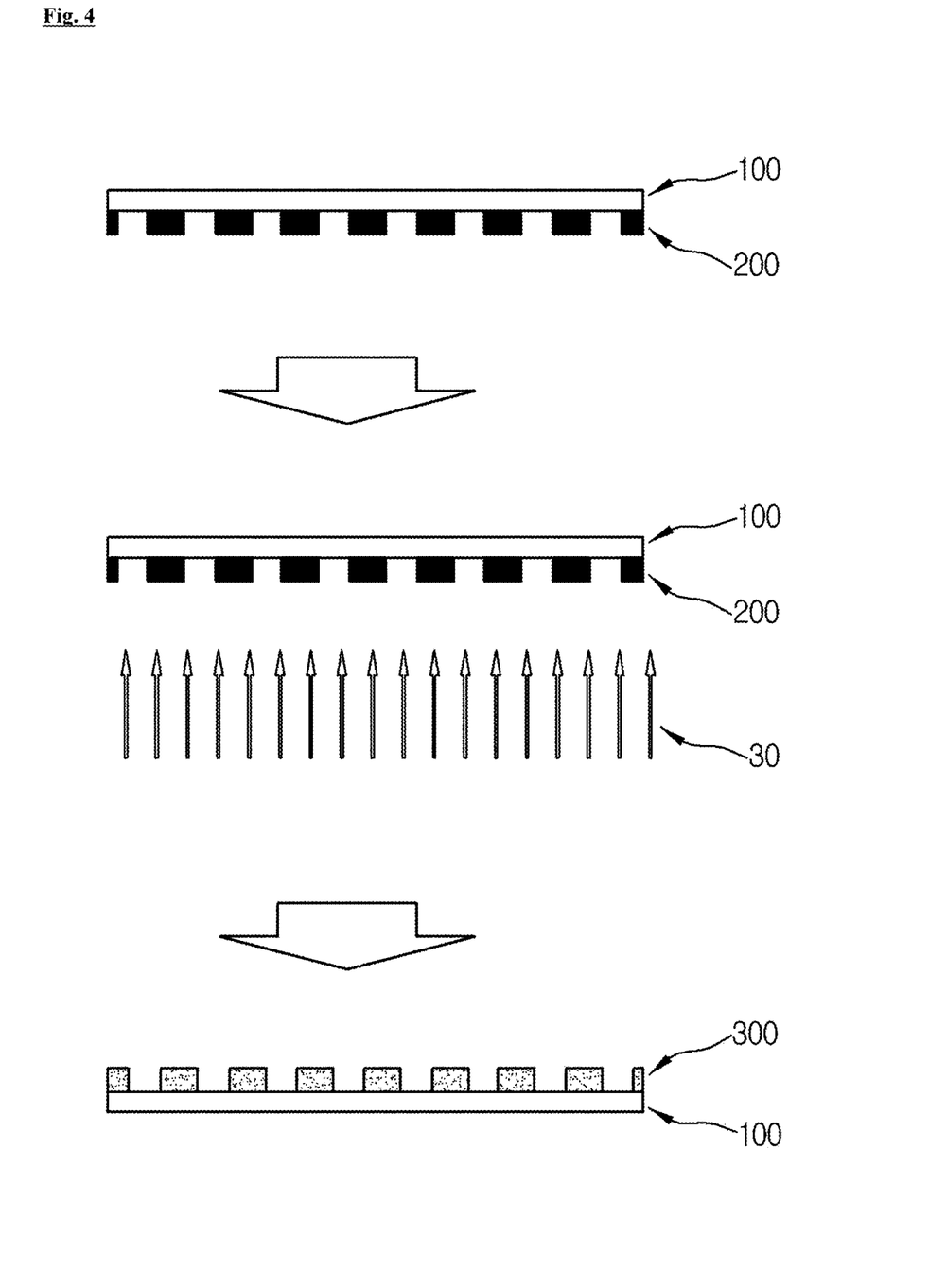
FIG. 4 is a view showing an exemplary embodiment of forming a protective layer on the surface of a lithium metal layer having fine pattern.

Referring to FIG. 4, when lithium metal is exposed to an air atmosphere, $Li_2CO_3$, $Li_2O$, LiOH, or the like are formed on a surface of the lithium metal according to the type of gas, referred to as a native film, present in the air atmosphere. The native film or a passivation film makes a current density non-uniform at a surface of the lithium metal and reduces a surface area required for dissolution and adsorption of lithium. Accordingly, in order to suppress the formation of such a native film, a protective layer is deposited on a surface of a lithium metal so that permeation of an electrolyte and moisture may be blocked.

According to the present disclosure, an interfacial adhesion between a lithium metal layer and a protective layer may be improved by forming a pattern on a surface of lithium metal in a process prior to depositing the protective layer on the surface of the lithium metal, and finally, an electrode specific surface area may be increased so that an effective current density may be decreased and a capacity of a battery may be maximized.

Here, a shape of the pattern is not particularly limited, but preferably has any one of a mesh shape, a lamellar shape, an embo shape, a linear shape, a circular shape, an elliptical shape, a polygonal shape, and a waveform shape.

The lithium metal may be in a form of a foil or sheet.

A method of connecting the lithium metal to a negative electrode is not particularly limited, but specifically, one entire surface of the lithium metal may be connected to the negative electrode by depositing or placing the lithium metal on a negative electrode current collector to make planar contact.

The negative electrode current collector may be made of platinum (Pt), gold (Au), palladium (Pd), iridium (Ir), silver (Ag), ruthenium (Ru), nickel (Ni), stainless steel (STS), copper (Cu), molybdenum (Mo), chromium (Cr), carbon (C), titanium (Ti), tungsten (W), In doped SnO2 (ITO), F doped SnO2 (FTO), and an alloy thereof, and a material obtained by surface-treating carbon (C), nickel (Ni), titanium (Ti) or silver (Ag) on a surface of copper (Cu) or stainless steel, but is not necessarily limited thereto.

A shape of the negative electrode current collector is not particularly limited, and may be in a form of, for example, a foil, a film, a sheet, a punched material, a porous body, a foam, or the like. Specifically, a copper material, and more specifically, a perforated copper foil is used as the negative electrode current collector.

The protective layer formed on the surface of the lithium metal includes an inorganic compound or an organic compound having ion conductivity, and carbon or lithium fluoride (LiF) is used in the present disclosure. In the present disclosure, as a method of forming the protective layer on the lithium metal, it is preferable to deposit carbon or lithium fluoride (LiF) on the lithium metal using any one method of thermal vapor deposition (TVD), physical vapor deposition (PVD), or sputtering deposition.

The protective layer formed using such a method has lithium ion conductivity and allows lithium ions to pass between the negative electrode and an electrolyte. The protective layer suppresses a reaction between the electrolyte and the negative electrode, suppresses an increase of an internal resistance of the battery, and improves reversibility of a deposition and dissolution reaction of lithium. By such a principle, a short circuit phenomenon due to formation of dendrites from the negative electrode may be prevented, and a lifespan of a charging and discharging cycle may be increased.

In a lithium secondary battery including a positive electrode, a negative electrode, a separator interposed between the positive electrode and the negative electrode, and an electrolyte in which a lithium salt is dissolved, a lithium secondary battery of the present disclosure including the negative electrode manufactured as described above is advantageous in that the effective current density is decreased to maximize the capacity of the battery, the resistance of the battery is prevented from being increased, and charging and discharging cycle efficiency is excellent.

Method for Preparing Lithium Metal Layer with Fine Pattern

Figure 1:
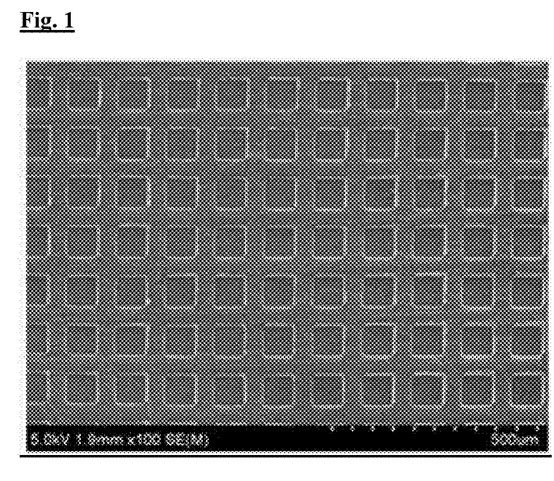
FIG. 1 is a SEM image of a lithium metal surface on which a fine pattern is formed in a negative electrode for a secondary battery according to the present disclosure.
Figure 2:
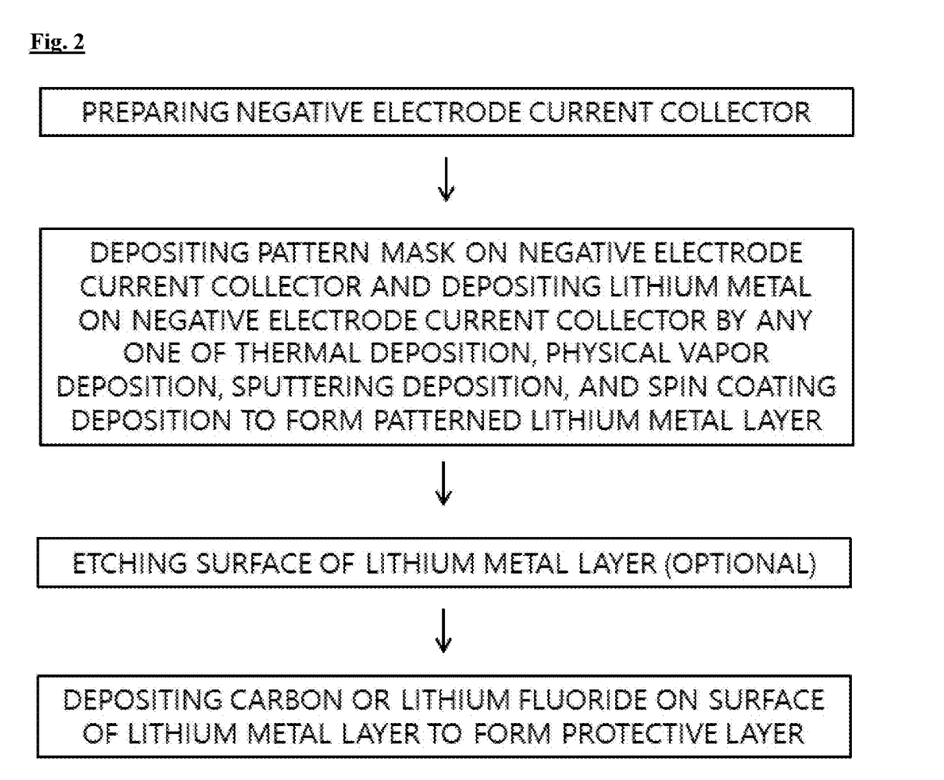
FIG. 2 is a schematic view showing a series of manufacturing processes of forming a lithium metal layer having a fine pattern using a pattern mask and a protective layer thereof.

FIG. 2 shows a series of preparing processes for forming a lithium metal layer having a fine pattern and a protective layer thereof using a pattern mask. Referring to FIG. 2, an exemplary example for preparing a negative electrode according to the present disclosure includes: disposing a pattern mask 40 on a negative electrode current collector 100 having a thickness of 5 to 20 μm; forming a lithium metal layer 200 having a fine pattern by depositing a lithium metal 20 on the negative electrode current collector 100 on which the pattern mask 40 is disposed; and depositing carbon or lithium fluoride (LiF) on a surface of the lithium metal layer 200 having the fine pattern to form a protective layer 300.

The negative electrode current collector is not particularly limited as long as it has conductivity without causing adverse chemical changes to the battery. Although a thickness of the negative electrode current collector is generally 3 to 500 μm, the negative electrode current collector having a thickness of 5 to 20 μm is used in the present disclosure. When the thickness of the negative electrode current collector is less than 5 μm, production efficiency is not great, and when the thickness exceeds 20 μm, a capacity per volume of a lithium battery decreases.

Figure 5:
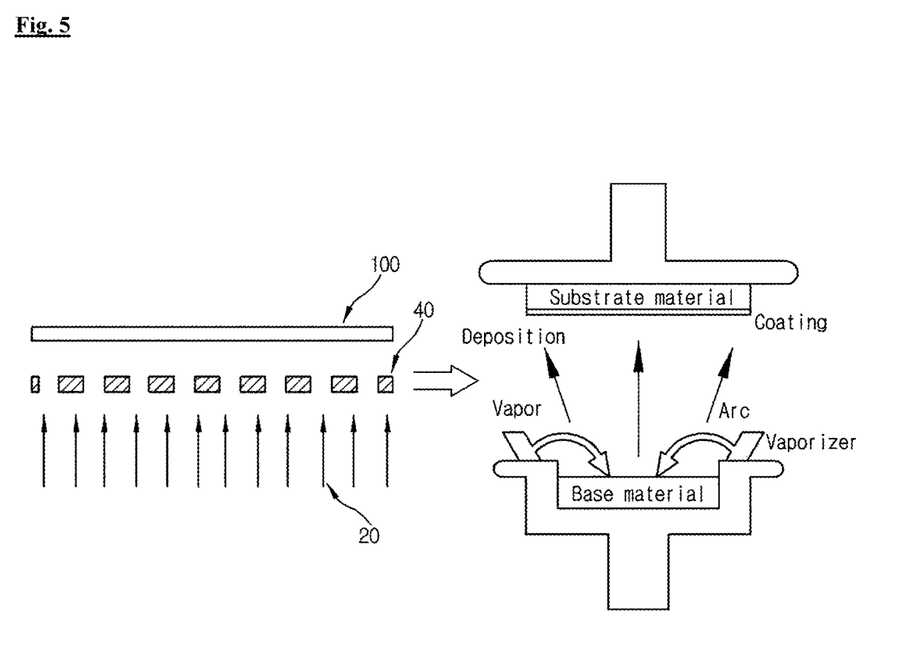
FIG. 5 is a view showing a principle of a thermal vapor deposition among the methods of depositing lithium in FIG. 3.

A method of depositing lithium metal on the negative electrode current collector is not particularly limited, but it is preferable to use any one method of thermal vapor deposition (TVD), physical vapor deposition (PVD), sputtering deposition, and spin coating deposition. FIG. 5 is a view showing a principle of a TVD method among the methods of depositing lithium metal.

Figure 3:
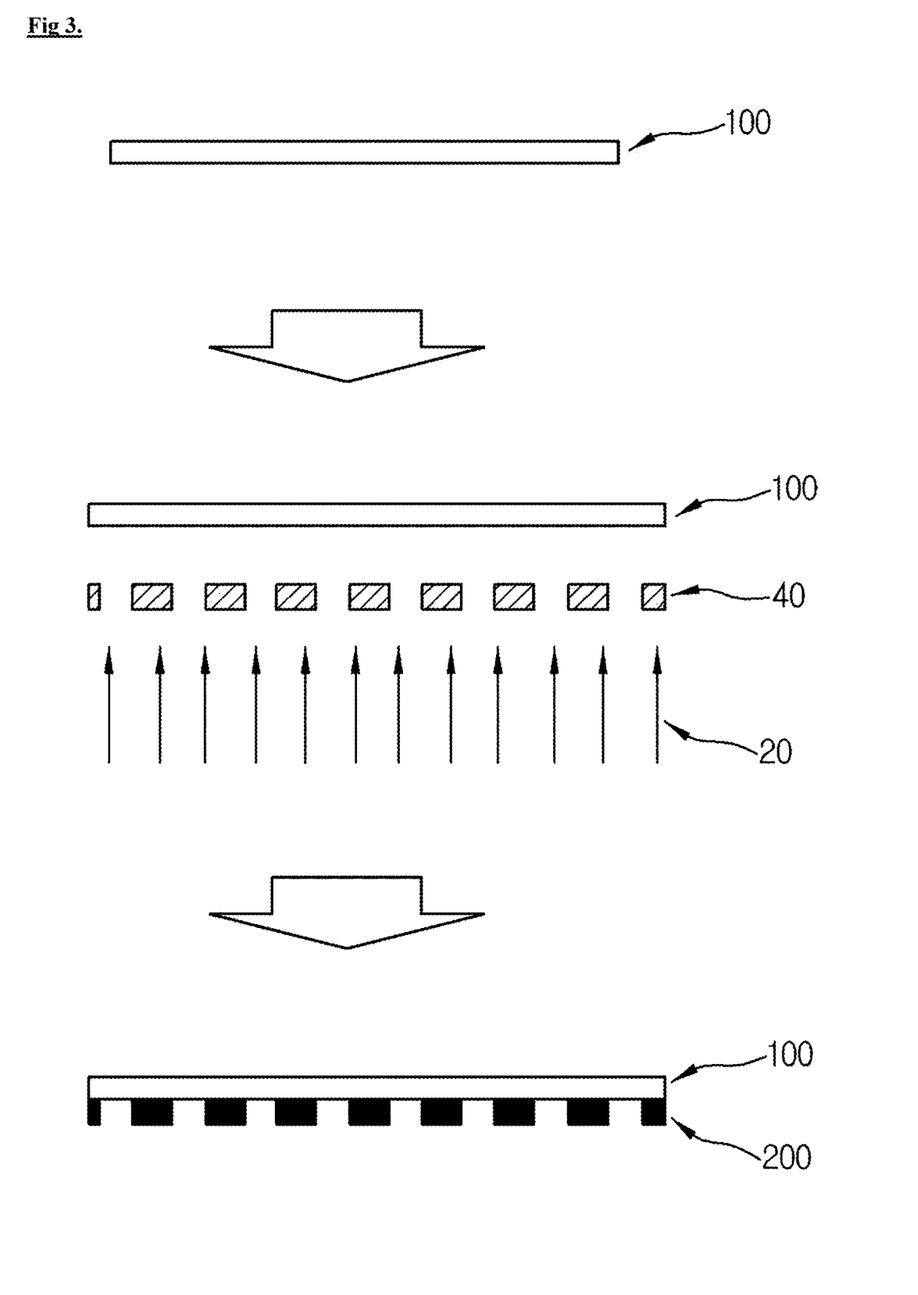
FIG. 3 is a view showing a process of disposing a pattern mask on a negative electrode current collector and then depositing lithium on the negative electrode current collector by the TVD method to form a lithium metal layer having a fine pattern.

In the present disclosure, in order to form a lithium metal layer having a fine pattern, the lithium metal is deposited by the above described deposition methods after a pattern mask 40 is disposed on a negative electrode current collector 100. As shown in FIGS. 3 and 5, when a deposition process is performed on the negative electrode current collector 100 on which the pattern mask 40 is disposed, the lithium metal as a deposition material may be deposited only on a portion of the negative electrode current collector 100 corresponding to voids of the pattern mask 40 so that the lithium metal layer 200 having the fine pattern is formed.

According to an exemplary embodiment of the present disclosure, a process of etching the surface of the lithium metal may be further included after forming the lithium metal layer having the pattern using the above described methods. The etching process on the surface of lithium metal is performed to remove impurities or a native film of the lithium metal. When the native film is removed prior to depositing the protective layer, an increase in an internal resistance is suppressed in comparison to a case in which the etching process is not performed, thereby achieving an increased lifespan of a charging and discharging cycle.

Figure 7:
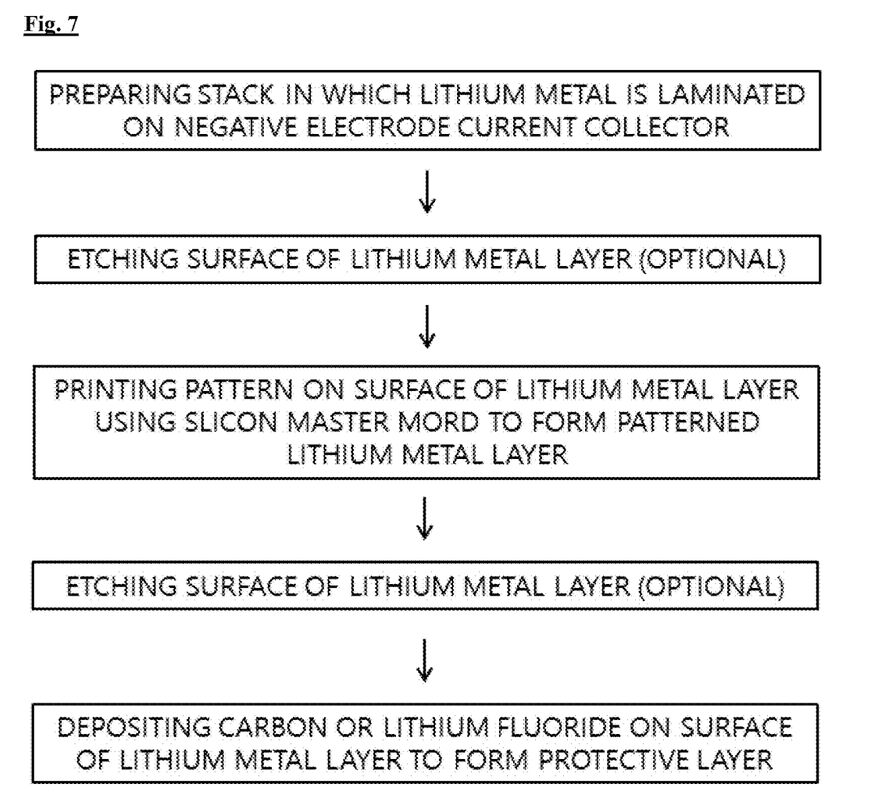
FIG. 7 is a schematic view showing a series of manufacturing processes of forming a lithium metal layer and a protective layer thereof by a method of forming a fine pattern by a printing technique using a silicon master mold.
Figure 8:
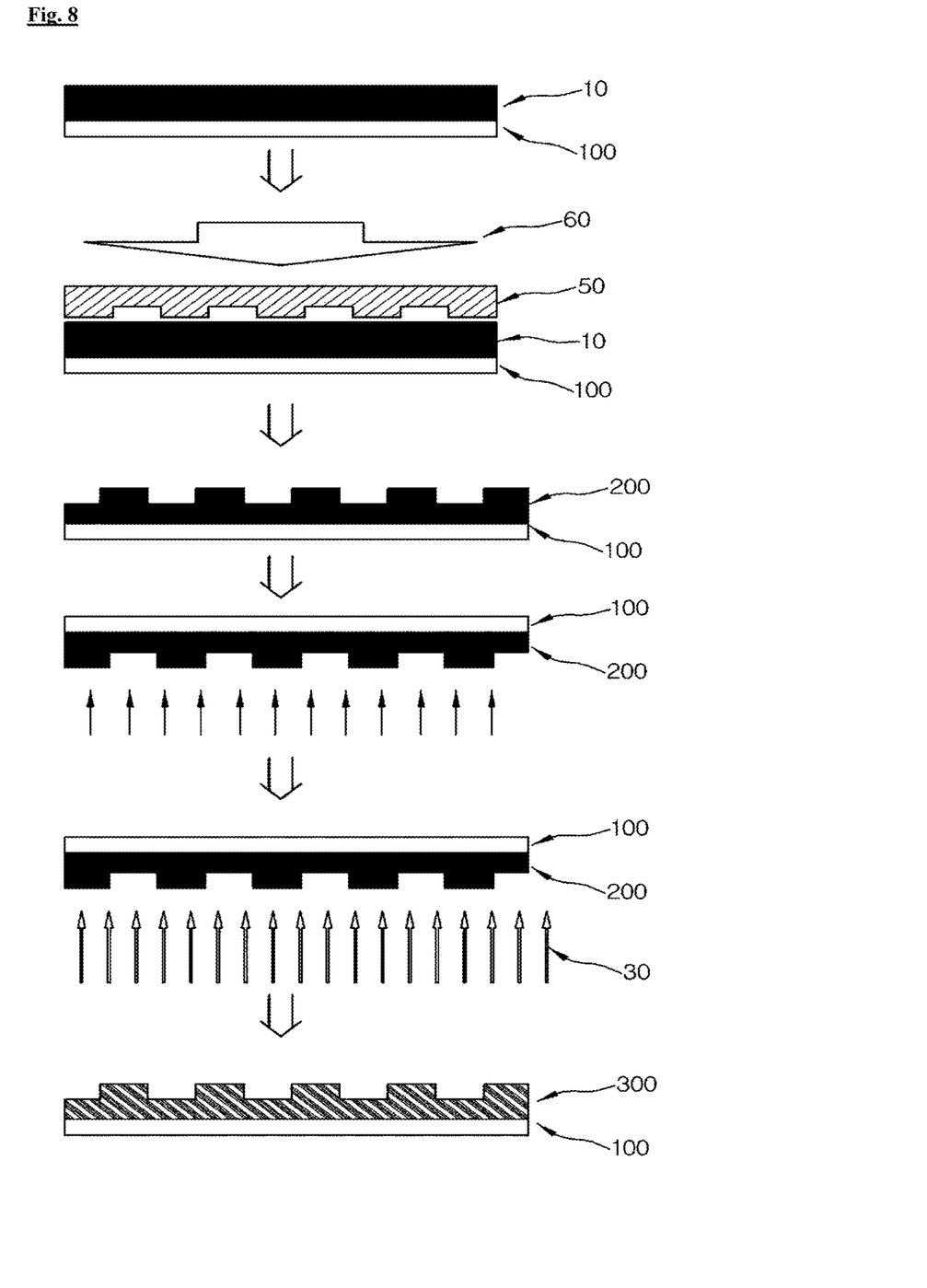
FIG. 8 is a view showing a series of manufacturing processes of forming a lithium metal layer and a protective layer thereof by a method of forming a fine pattern by a printing technique using a silicon master mold.

In the present disclosure, the lithium metal layer having the fine pattern may be formed by using a silicon master mold in addition to the method of using the above described pattern mask. FIGS. 7 and 8 show a series of preparing processes for forming a lithium metal layer having a fine pattern and a protective layer thereof by a printing technique using a silicon master mold. Referring to FIGS. 7 and 8, a method for preparing a negative electrode for a secondary battery includes laminating a lithium metal 10 on a negative electrode current collector 100 to manufacture a stack having a thickness of 10 to 300 μm, printing a pattern using a silicon master mold 50 on the lithium metal 10 to form a lithium metal layer 200 having a fine pattern; and depositing carbon or lithium fluoride (LiF) on a surface of the lithium metal layer 200 having the fine pattern to form a protective layer 300.

A thickness of the negative electrode current collector 100 and the lithium metal stack may be 10 to 300 μm. When the thickness is less than 10 μm, productivity is degraded, and when the thickness exceeds 300 μm, a capacity per volume of a lithium battery is decreased.

Since lithium metal is a relatively flexible metal, when the silicon master mold 50, which is harder than the lithium metal, is disposed on the lithium metal 10 and pressure is applied to the silicon master mold 50 by a press 60, an etching form of the silicon master mold 50 is directly transferred onto the surface of the lithium metal 10. Thus, the fine pattern may be formed on the lithium metal 10 using such a transcription technique.

In the present disclosure, any silicon master mold manufactured according to any known technique may be used to form a pattern on the lithium metal. For example, a desired shape may be transferred onto a photoresist by disposing a photomask of the desired shape on a silicon wafer coated with the photoresist and being exposed to ultraviolet rays. Then, silicon is etched according to the desired shape to manufacture the silicon master mold.

When the silicon master mold is used to manufacture the lithium metal layer having the pattern as described above, a process of etching the surface of the lithium metal may be further included at any stage before or after a process of forming the lithium metal layer having the pattern. The etching is performed on the surface of lithium metal to remove impurities or a native film of the lithium metal. When the native film is removed prior to depositing the protective layer, an increase in an internal resistance is suppressed in comparison to a case in which the etching process is not performed, thereby maximizing the capacity of the secondary battery.

Figure 6:
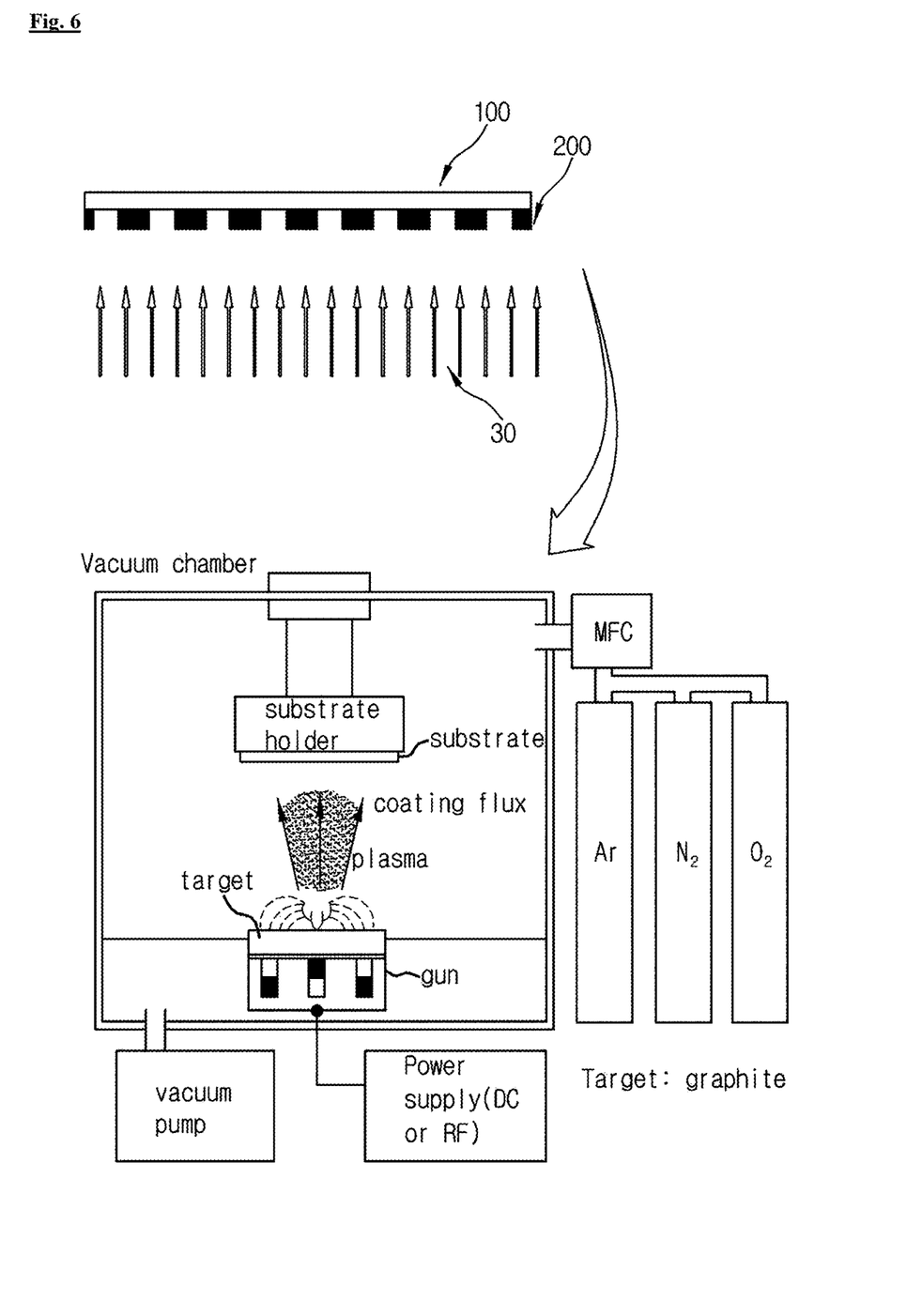
FIG. 6 is a view showing an exemplary embodiment of a sputtering method, which is one of the methods of forming a protective layer on the surface of a lithium metal layer having a fine pattern in FIG. 4 and FIG. 8.

The protective layer is formed along the patterned surface of the lithium metal after the lithium metal layer having a fine pattern as described above is manufactured. The protective layer is not limited as long as it has a material capable of blocking permeation of an electrolyte and moisture, but carbon or lithium fluoride may be used. Further, a method of forming the protective layer is not particularly limited, but it is preferable to form the protective layer by thermal vapor deposition (TVD), physical vapor deposition (PVD), or sputtering deposition. FIG. 6 shows an example of forming the protective layer by depositing carbon on the surface of the lithium metal by argon sputtering. Meanwhile, when depositing a material having a low melting point like lithium fluoride, it may be advantageous to use a thermal vapor deposition (TVD) method.

The protective layer formed using such a method has lithium ion conductivity and allows lithium ions to pass between a negative electrode and an electrolyte. The protective layer suppresses a reaction between the electrolyte and the negative electrode, suppresses an increase of an internal resistance of the battery, and improves reversibility of a deposition and dissolution reaction of lithium. By such a principle, a short circuit phenomenon due to formation of dendrites from the negative electrode may be prevented, and the capacity of the lithium secondary battery may be maximized.

In the present disclosure, the etching process is performed on the surface of the lithium metal to remove impurities or a native film of the lithium metal. Here, an etching treatment method is not particularly limited, but it is preferable to use either an inert gas plasma sputtering method or a plasma etching method.

Hereinafter, the present disclosure will be described in more details through examples.

Example 1

A pattern mask having a mesh-shaped pattern was disposed on a copper foil in a vacuum chamber and lithium metal was deposited by a thermal vapor deposition (TVD) method (target:Li) at a temperature of 300° C. for 60 minutes under an argon gas atmosphere to form a lithium metal layer having a fine mesh-shaped pattern. Thereafter, the pattern mask was removed, and carbon was deposited on a surface of the lithium metal by a plasma sputtering method under vacuum for 60 minutes.

A positive electrode mixture slurry was manufactured by adding 96 wt % of LiCoO2 as a positive electrode active material, 2 wt % of Denka black as a conductive material, and 2 wt % of polyvinylidene fluoride (PVDF) as a binder to N-Methyl-2-Pyrrolidone (NMP). One surface of an aluminum current collector was coated with the manufactured positive electrode mixture slurry to a thickness of 65 μm, dried and rolled, and then punched to a predetermined size to manufacture a positive electrode.

The lithium metal manufactured by the above described method was used as a negative electrode, a polyolefin separator was interposed between the positive electrode and the negative electrode, and an electrolyte in which 1M lithium hexafluorophosphate ($LiPF_6$) was dissolved was injected into a solvent in which ethylene carbonate (EC) and ethyl methyl carbonate (DEC) were mixed at a volume ratio of 50:50 to manufacture a coin type half-cell.

Example 2

A coin type half-cell was manufactured in the same manner as in Example 1, except that lithium fluoride, instead of carbon, was deposited on the surface of the lithium metal of Example 1 on which the pattern was formed by using a thermal vapor deposition (TVD) method (target:LiF).

Example 3

A coin type half-cell was manufactured in the same manner as in Example 1, except that the pattern had a waveform shape.

Example 4

A coin type half-cell was manufactured in the same manner as in Example 1, except that the pattern had a circular shape.

Example 5

A coin type half-cell was manufactured in the same manner as in Example 2, except that the pattern formed on the surface of the lithium metal had a waveform shape.

Example 6

A coin type half-cell was manufactured in the same manner as in Example 2, except that the pattern formed on the surface of the lithium metal had a circular shape.

Example 7

A pattern mask having a mesh-shaped pattern was disposed on a copper foil in a vacuum chamber and lithium metal was deposited by a thermal vapor deposition (TVD) method at a temperature of 300° C. for 60 minutes under an argon gas atmosphere to form a lithium metal layer having a fine mesh-shaped pattern. Thereafter, the pattern mask was removed and a native film was etched by an argon plasma sputtering method for 30 minutes. Carbon was deposited on the surface of the lithium metal from which the native film had been removed under vacuum for 60 minutes by a plasma sputtering method.

A coin type half-cell was manufactured in the same manner as in Example 1, except that the lithium metal obtained by the above described method was used as a negative electrode.

Example 8

A coin type half-cell was manufactured in the same manner as in Example 7, except that lithium fluoride instead of carbon was deposited on the surface of the lithium metal of Example 7 on which the pattern was formed by using a thermal vapor deposition (TVD) method (target:LiF).

Example 9

A coin type half-cell was manufactured in the same manner as in Example 7, except that the pattern formed on the surface of the lithium metal had a waveform shape.

Example 10

A coin type half-cell was manufactured in the same manner as in Example 7, except that the pattern formed on the surface of the lithium metal had a circular shape.

Example 11

A coin type half-cell was manufactured in the same manner as in Example 8, except that the pattern formed on the surface of the lithium metal had a waveform shape.

Example 12

A coin type half-cell was manufactured in the same manner as in Example 8, except that the pattern formed on the surface of the lithium metal had a circular shape.

Example 13

After placing the lithium metal on the copper foil so as to come into planar contact, a silicon master mold having a mesh-shaped pattern was disposed on an upper portion of the lithium metal. Thereafter, a force was applied to the silicon master mold to transfer the pattern of the silicon master mold onto the surface of the lithium metal, thereby preparing a lithium metal having a fine pattern. The obtained lithium metal and copper foil stack were placed in a vacuum chamber and a native film was removed by an argon plasma sputtering method under vacuum for 30 minutes. The surface of the lithium metal from which the native film had been removed was subjected to a plasma sputtering method under vacuum for 60 minutes to manufacture a carbon-deposited lithium metal.

A coin type half-cell was manufactured in the same manner as in Example 1, except that the lithium metal manufactured as described above was used as a negative electrode.

Example 14

A coin type half-cell was manufactured in the same manner as in Example 13, except that lithium fluoride, instead of carbon, was deposited on the surface of the lithium metal of Example 13 on which the pattern was formed by using a thermal vapor deposition (TVD) method (target:LiF).

Example 15

A coin type half-cell was manufactured in the same manner as in Example 13, except that the pattern formed on the surface of the lithium metal had a waveform shape.

Example 16

A coin type half-cell was manufactured in the same manner as in Example 13, except that the pattern formed on the surface of the lithium metal had a circular shape.

Example 17

A coin type half-cell was manufactured in the same manner as in Example 14, except that the shape of the pattern formed on the surface of the lithium metal had a waveform shape.

Example 18

A coin type half-cell was manufactured in the same manner as in Example 14, except that the pattern formed on the surface of the lithium metal had a circular shape.

Example 19

After placing the lithium metal on the copper foil so as to come into planar contact, the copper foil and the lithium metal were placed in a vacuum chamber and a native film was removed by an argon plasma sputtering method under vacuum for 30 minutes. A silicon master mold having a mesh-shaped pattern was disposed on an upper portion of the lithium metal from which the native film has been removed. Thereafter, a force was applied to the silicon master mold to transfer the pattern of the silicon master mold onto the surface of the lithium metal. The lithium metal and copper foil stack having a fine pattern were subjected to a plasma sputtering method under vacuum for 60 minutes to manufacture a carbon-deposited lithium metal.

A coin type half-cell was manufactured in the same manner as in Example 1, except that the lithium metal manufactured as described above was used as a negative electrode.

Example 20

A coin type half-cell was manufactured in the same manner as in Example 19, except that lithium fluoride, instead of carbon, was deposited on the surface of the lithium metal of Example 19 on which the pattern was formed by using a thermal vapor deposition (TVD) method (target:LiF).

Example 21

A coin type half-cell was manufactured in the same manner as in Example 19, except that the pattern formed on the surface of the lithium metal had a waveform shape.

Example 22

A coin type half-cell was manufactured in the same manner as in Example 19, except that the pattern formed on the surface of the lithium metal had a circular shape.

Example 23

A coin type half-cell was manufactured in the same manner as in Example 20, except that the pattern formed on the surface of the lithium metal had a waveform shape.

Example 24

A coin type half-cell was manufactured in the same manner as in Example 20, except that the pattern formed on the surface of the lithium metal had a circular shape.

Comparative Example 1

A positive electrode mixture slurry was manufactured by adding 96 wt % of LiCoO2 as a positive electrode active material, 2 wt % of Denka black as a conductive material, and 2 wt % of polyvinylidene fluoride (PVDF) as a binder to N-Methyl-2-Pyrrolidone (NMP). One surface of an aluminum current collector was coated with the manufactured positive electrode mixture slurry to a thickness of 65 μm, dried and rolled, and then punched to a predetermined size to manufacture a positive electrode.

The lithium metal (150 μm, extruded lithium) foil in the state as received was used as a negative electrode, a polyolefin separator was interposed between the positive electrode and the negative electrode, and an electrolyte in which 1M lithium hexafluorophosphate ($LiPF_6$) was dissolved was injected into a solvent in which ethylene carbonate (EC) and ethyl methyl carbonate (DEC) were mixed at a volume ratio of 50:50 to manufacture a coin type half-cell.

Comparative Example 2

A coin type half-cell was manufactured in the same manner as in Comparative Example 1, except that a lithium metal manufactured by placing the lithium metal (150 μm, extruded lithium) in the state as received in a vacuum chamber and etching a native film by an argon plasma sputtering method under vacuum for 30 minutes was used as a negative electrode.

Comparative Example 3

A coin type half-cell was manufactured in the same manner as in Comparative Example 1, except that a lithium metal manufactured by depositing carbon on the surface of the lithium metal (150 μm, extruded lithium) in the state as received by a plasma sputtering method under vacuum for 60 minutes was used as a negative electrode.

Comparative Example 4

A coin type half-cell was manufactured in the same manner as in Comparative Example 1, except that a lithium metal manufactured by depositing lithium fluoride on the surface of the lithium metal (150 μm, extruded lithium) in the state as received by a thermal vapor deposition (TVD) method under vacuum was used as a negative electrode.

Comparative Example 5

A coin type half-cell was manufactured in the same manner as in Comparative Example 1, except that a lithium metal manufactured by depositing carbon on the surface of the lithium metal from which a native film was removed, instead of being coated with lithium metal foil of Comparative Example 1 by a plasma sputtering method (target: graphite) under vacuum for 60 minutes was used as a negative electrode.

Comparative Example 6

A coin type half-cell was manufactured in the same manner as in Comparative Example 1, except that a lithium metal manufactured by depositing lithium fluoride on the surface of the lithium metal from which a native film was removed, instead of being coated with lithium metal foil of Comparative Example 1 by a thermal vapor deposition (TVD) method (target:LiF) under vacuum for 60 minutes was used as a negative electrode.

Experimental Example 1

The coin type half-cells manufactured by the methods of Examples 1 to 24 and Comparative Examples 1 to 6 were charged and discharged by using an electrochemical charging and discharging device. The charging was performed until the voltage reached 4.4 V vs. Li/Li$^+$, the discharging was performed until the voltage reached 3.0 V vs. Li/Li$^+$, and current density was applied at 0.5 C-rate.

Evaluation Method of Charging and Discharging Capacity Retention Rate

The first and 100th charging capacities and discharging capacities were measured in the charging and discharging processes of Examples 1 to 24 and Comparative Examples 1 to 6, and a retention rate of the discharging capacity in the 100th cycle with respect to the discharging capacity in the first cycle was calculated by the following equation, and the results are shown in Table 1.

Capacity Retention Rate (%)=(100th Discharge Capacity/First Discharge Capacity)×100

TABLE 1

| Type | Pattern Shape Of Lithium Metal | Patterning method | Etching Process Performed Or Not And When | Protective Layer | First Discharging Capacity (mAh/g) | 100th Discharging Capacity (mAh/g) | Capacity Retention Rate (%) |
|---|---|---|---|---|---|---|---|
| Example 1 | Mesh | Pattern Mask | X | Carbon | 169.3 | 60.3 | 35.6 |
| Example 2 | Mesh | | X | Lithium Fluoride | 168.4 | 52.6 | 31.2 |
| Example 3 | Waveform | | X | Carbon | 168.5 | 59.7 | 35.4 |
| Example 4 | Circle | | X | Carbon | 169.1 | 60.4 | 35.7 |
| Example 5 | Waveform | | X | Lithium Fluoride | 168.5 | 51.9 | 30.8 |
| Example 6 | Circle | | X | Lithium Fluoride | 170.0 | 52.0 | 30.5 |

TABLE 1-continued

| Type | Pattern Shape Of Lithium Metal | Patterning method | Etching Process Performed Or Not And When | Protective Layer | First Discharging Capacity (mAh/g) | 100th Discharging Capacity (mAh/g) | Capacity Retention Rate (%) |
|---|---|---|---|---|---|---|---|
| Example 7 | Mesh | | ○ | Carbon | 170.0 | 75.0 | 44.1 |
| Example 8 | Mesh | | ○ | Lithium Fluoride | 169.5 | 68.9 | 40.6 |
| Example 9 | Waveform | | ○ | Carbon | 170.1 | 75.2 | 44.2 |
| Example 10 | Circle | | ○ | Carbon | 169.8 | 75.3 | 44.3 |
| Example 11 | Waveform | | ○ | Lithium Fluoride | 170.1 | 69.0 | 40.5 |
| Example 12 | Circle | | ○ | Lithium Fluoride | 170.1 | 68.9 | 40.5 |
| Example 13 | Mesh | Silicone Master Mold | ○ (After Pattern Was Formed) | Carbon | 170.3 | 76.1 | 44.6 |
| Example 14 | Mesh | | ○ (After Pattern Was Formed) | Lithium Fluoride | 169.5 | 66.1 | 38.9 |
| Example 15 | Waveform | | ○ (After Pattern Was Formed) | Carbon | 170.2 | 75.9 | 44.5 |
| Example 16 | Circle | | ○ (After Pattern Was Formed) | Carbon | 170.5 | 76.5 | 44.8 |
| Example 17 | Waveform | | ○ (After Pattern Was Formed) | Lithium Fluoride | 169.8 | 64.5 | 37.9 |
| Example 18 | Circle | | ○ (After Pattern Was Formed) | Lithium Fluoride | 169.9 | 65.2 | 38.3 |
| Example 19 | Mesh | | ○ (Before Pattern Was Formed) | Carbon | 170.1 | 75.9 | 44.6 |
| Example 20 | Mesh | | ○ (Before Pattern Was Formed) | Lithium Fluoride | 169.9 | 65.5 | 38.5 |
| Example 21 | Waveform | | ○ (Before Pattern Was Formed) | Carbon | 170.2 | 76.9 | 45.1 |
| Example 22 | Circle | | ○ (Before Pattern Was Formed) | Carbon | 170.3 | 77.2 | 45.3 |
| Example 23 | Waveform | | ○ (Before Pattern Was Formed) | Lithium Fluoride | 170.1 | 68.1 | 40.0 |
| Example 24 | Circle | | ○ (Before Pattern Was Formed) | Lithium Fluoride | 170.2 | 67.8 | 39.8 |
| Comparative Example 1 | X | — | X | X | 169.5 | 32.6 | 19.3 |
| Comparative Example 2 | X | — | ○ | X | 170.3 | 39.6 | 23.2 |
| Comparative Example 3 | X | — | X | Carbon | 169.3 | 55.3 | 32.7 |
| Comparative Example 4 | X | — | X | Lithium Fluoride | 168.2 | 49.8 | 29.6 |
| Comparative Example 5 | X | — | ○ | Carbon | 170.4 | 72.2 | 42.4 |
| Comparative Example 6 | X | — | ○ | Lithium Fluoride | 169.8 | 62.3 | 36.7 |

As shown in the results of Table 1, in Comparative Example 1 in which the lithium metal from which a native film was not removed and without a protective layer was used, the capacity retention rate was the worst, and in Comparative Example 2 in which the lithium metal from which the native film was removed, but with which the protective layer was not coated was used, the capacity retention rate was also poor.

It is confirmed that in a case of Comparative Examples 3 and 4 in which the lithium metal from which a native film was not removed, but with which the coated protective layer was used, the capacity retention rate was better than that of Comparative Examples 1 and 2, but the capacity retention rate was poorer than that of Examples 1 to 6 in which the lithium metal in which the fine pattern was formed was used under the same conditions.

It is confirmed that in a case of Comparative Examples 5 and 6 in which the lithium metal from which the native film was removed, and with which the coated protective layer was used, the capacity retention rate was excellent in a comparative example group, but the capacity retention rate was poor in comparison to that of Examples 7 to 24 in which the lithium metal in which the fine pattern was formed was used under the same conditions.

Accordingly, it is confirmed that a negative electrode for a secondary battery, which is composed of a lithium metal layer having a fine pattern of the present disclosure and a protective layer formed along a surface of the lithium metal layer having the fine pattern, has an effect of maximizing a capacity of a battery.

While the present disclosure has been particularly described with reference to exemplary embodiments, it will be understood by those of skill in the art that various changes in form and details may be made without departing from the spirit and scope of the present disclosure. Therefore, the exemplary embodiments should be considered in a descriptive sense only and not for purposes of limitation. The scope of the disclosure is defined not by the detailed description of the disclosure but by the appended claims, and encompasses all modifications and equivalents that fall within the scope of the appended claims.

DESCRIPTION OF SYMBOLS

10: Lithium Metal
20: Lithium Vapor
30: Carbon Plasma
40: Pattern Mask
50: Silicone Master Mold
60: Press
100: Negative Electrode Current Collector
200: Lithium Metal layer having Fine Pattern
300: Lithium Metal Layer coated with Protective Layer

The invention claimed is:

1. A negative electrode for a secondary battery including a negative electrode current collector and a lithium metal, the negative electrode comprising:
   a negative electrode current collector;
   a lithium metal layer having a pattern formed on the negative electrode current collector; and
   a protective layer formed along a surface of the lithium metal layer having the pattern,
   wherein the protective layer is formed by depositing carbon or lithium fluoride (LiF) on a surface of the lithium metal.

2. The negative electrode of claim 1, wherein a shape of the pattern has any one of a mesh shape, a lamellar shape, an embo shape, a linear shape, a circular shape, an elliptical shape, a polygonal shape, and a waveform shape.

3. A method for manufacturing a negative electrode for a secondary battery including a lithium metal having a pattern and a protective layer, the method comprising:
   disposing a pattern mask on a negative electrode current collector;
   forming a lithium metal layer having the pattern by depositing the lithium metal on the negative electrode current collector on which the pattern mask is disposed; and
   depositing carbon or lithium fluoride (LiF) on a surface of the lithium metal layer having the pattern to form the protective layer.

4. The method of claim 3, further comprising a process of etching the surface of the lithium metal after the process of forming the lithium metal layer having the pattern.

5. The method of claim 3, wherein, in the process of forming the lithium metal layer having the pattern, the lithium metal is deposited using any one method of thermal vapor deposition (TVD), physical vapor deposition (PVD), sputtering deposition, and spin coating.

6. A method for manufacturing a negative electrode for a secondary battery including a lithium metal having a pattern and a protective layer, the method comprising:
   laminating a lithium metal on a negative electrode current collector to manufacture a stack;
   forming a lithium metal layer having a pattern by printing the pattern on the lithium metal using a silicon master mold; and
   depositing carbon or lithium fluoride (LiF) on a surface of the lithium metal layer having the pattern to form the protective layer.

7. The method of claim 6, further comprising a process of etching the surface of the lithium metal at any stage before or after the process of forming the lithium metal layer having the pattern.

8. The method of claim 3, wherein the protective layer is formed by depositing carbon or lithium fluoride (LiF) on a surface of the lithium metal layer by any one method of thermal vapor deposition (TVD), physical vapor deposition (PVD), and sputtering deposition.

9. The method of claim 4, wherein the etching of the surface of the lithium metal is performed by either inert gas plasma sputtering or plasma etching.

10. A lithium secondary battery comprising a positive electrode, a negative electrode, a separator interposed between the positive electrode and the negative electrode, and an electrolyte in which a lithium salt is dissolved, wherein the negative electrode is the negative electrode of claim 1.

* * * * *